US008010584B1

(12) United States Patent
Craver et al.

(10) Patent No.: US 8,010,584 B1
(45) Date of Patent: Aug. 30, 2011

(54) RELATIONAL DATABASE METHOD FOR TECHNOLOGY PROGRAM MANAGEMENT

(75) Inventors: Jeffrey T. Craver, Meridianville, AL (US); Michael S. Ellis, Hunstville, AL (US)

(73) Assignee: The United States of America, as represented by the Secretary of the Army, Washington, DC (US)

(*) Notice: Subject to any disclaimer, the term of this patent is extended or adjusted under 35 U.S.C. 154(b) by 457 days.

(21) Appl. No.: 12/235,128

(22) Filed: Sep. 22, 2008

Related U.S. Application Data

(60) Provisional application No. 60/974,718, filed on Sep. 24, 2007.

(51) Int. Cl.
*G06F 7/00* (2006.01)
*G06F 17/00* (2006.01)

(52) U.S. Cl. ......... 707/812; 707/804; 715/227; 715/255

(58) Field of Classification Search .................. 707/812, 707/804; 715/227, 255
See application file for complete search history.

(56) References Cited

U.S. PATENT DOCUMENTS

| | | | | |
|---|---|---|---|---|
| 5,666,532 | A * | 9/1997 | Saks et al. | 707/613 |
| 5,729,736 | A * | 3/1998 | Gomi et al. | 707/783 |
| 6,023,699 | A | 2/2000 | Knoblock et al. | |
| 6,098,070 | A | 8/2000 | Maxwell | |
| 6,662,179 | B2 | 12/2003 | Benjamin et al. | |
| 7,111,016 | B2 * | 9/2006 | Gurevich | 717/108 |
| 7,346,599 | B2 * | 3/2008 | Ogawa et al. | 726/2 |
| 7,376,636 | B1 | 5/2008 | Wang et al. | |
| 7,783,737 | B2 * | 8/2010 | Fujino et al. | 709/223 |
| 7,865,529 | B2 * | 1/2011 | Kobayashi | 707/796 |
| 2006/0026538 | A1 | 2/2006 | Shah et al. | |
| 2010/0205015 | A1 * | 8/2010 | McGiffin et al. | 705/4 |

OTHER PUBLICATIONS

United States, Deputy Under Secretary of Defense for Science and Technology, Department of Defense, Technology Readiness Assessment Deskbook, May 2005, pp. C-1 to C-43, accessed Aug. 28, 2007, <https://acc.dau.mil/GetAttachment.aspx?id=18545&pname=file&aid=729&lang=en-US>.

United States, Defense Acquisition Agency, Department of Defense, Defense Acquisition Guidebook, Chapter 10.5.2, "Technology Maturity and Technology Readiness Assessments," Jul. 2006, 4 pp., accessed Aug. 28, 2007, <https://akss.dau.mil/dag/DoD5000.asp?view=document&rf=GuideBook\IG_c10.5.2.asp>.

Craver, Jeffrey T. And Michael S. Ellis, United States Army Space and Missile Defense Command, Technology Program Management Model Manual, v.2, 2006, 329 pp.

(Continued)

*Primary Examiner* — Mohammad Ali
*Assistant Examiner* — Bao G Tran
(74) *Attorney, Agent, or Firm* — C. Joan Gilsdorf

(57) ABSTRACT

A Technology Program Management Model (TPMM) for management of technology development. The TPMM is an activities-based model that is subdivided along technology readiness level (TRL) boundaries into phases of technology development that logically progress from concept to operational capability and readiness for transition to the customer/end user. The TPMM provides a standardized approach to technology development that incorporates systems engineering and programmatic principles and practices with transition management in a stage-gated process for TRL-based maturity assessment. The TPMM includes a relational database that relates the activities to one another, to entry and exit criteria for each phase, and to documentation that demonstrates that the activity meets the requirements of each phase.

2 Claims, 11 Drawing Sheets

OTHER PUBLICATIONS

Craver, J. and Ellis, M. (2006). Technology Program Management Model. Presented at the NDIA Systems Engineering Conference.

"Technology Readiness Level," Wikipedia, 14 pp., accessed Aug. 27, 2008, <http://en.wikipedia.org/wiki/Technology_Readiness_Level>.

Nolte, W., Kennedy, B., and Dziegiel, R. (2003). Technology Readiness Level Calculator. Presented at the NDIA Systems Engineering Conference.

"Capability Maturity Model Integration," Wikipedia, 19 pp., accessed Aug. 27, 2008, <http://en.wikipedia.org/wiki/CMMI>.

* cited by examiner

Technology Readiness Levels (Source: DoD TRA Deskbook, 2005)

| TRL | Definition | Description | Supporting Information |
|---|---|---|---|
| 1 | Basic principles observed and reported. | Lowest level of technology readiness. Scientific research begins to be translated into applied research and development (R&D). Examples might include paper studies of a technology's basic properties. | Published research that identifies the principles that underlie this technology. References to who, where, when. |
| 2 | Technology concept and/or application formulated. | Invention begins. Once basic principles are observed, practical applications can be invented. Applications are speculative, and there may be no proof or detailed analysis to support the assumptions. Examples are limited to analytic studies. | Publications or other references that outline the application being considered and that provide analysis to support the concept. |
| 3 | Analytical and experimental critical function and/or characteristic proof of concept. | Active R&D is initiated. This includes analytical studies and laboratory studies to validate physically the analytical predictions of separate elements of the technology. Examples include components that are not yet integrated or representative. | Results of laboratory tests performed to measure parameters of interest and comparison to analytical predictions for critical subsystems. References to who, where, and when these tests and comparisons were performed. |

FIG. 1A

Technology Readiness Levels (continued)

| TRL | Definition | Description | Supporting Information |
|---|---|---|---|
| 4 | Component and/or breadboard validation in a laboratory environment. | Basic technological components are integrated to establish that they will work together. This is relatively "low fidelity" compared with the eventual system. Examples include integration of "ad hoc" hardware in the laboratory. | System concepts that have been considered and results from testing laboratory scale breadboard(s). References to who did this work and when. Provide an estimate of how breadboard hardware and test results differ from the expected system goals. |
| 5 | Component and/or breadboard validation in a relevant environment. | Fidelity of breadboard technology increases significantly. The basic technological components are integrated with reasonably realistic supporting elements so they can be tested in a simulated environment. Examples include "high fidelity" laboratory integration of components. | Results from testing a laboratory breadboard system are integrated with other supporting elements in a simulated operational environment. How does the "relevant environment" differ from the expected operational environment? How do the test results compare with expectations? What problems, if any, were encountered? Was the breadboard system refined to more nearly match the expected system goals? |
| 6 | System/subsystem model or prototype demonstration in a relevant environment. | Representative model or prototype system, which is well beyond that of TRL 5, is tested in a relevant environment. Represents a major step up in a technology's demonstrated readiness. Examples include testing a prototype in a high fidelity laboratory environment or in a simulated operational environment. | Results from laboratory testing of a prototype system that is near the desired configuration in terms of performance, weight, and volume. How did the test environment differ from the operational environment? Who performed the tests? How did the test compare with expectations? What problems, if any, were encountered? What are/were the plans, options, or actions to resolve problems before moving to the next level? |

FIG. 1B

Technology Readiness Levels (continued)

| TRL | Definition | Description | Supporting Information |
|---|---|---|---|
| 7 | System prototype demonstration in an operational environment. | Prototype near or at planned operational system. Represents a major step up from TRL 6 by requiring demonstration of an actual system prototype in an operational environment (e.g., in an aircraft, in a vehicle, or in space). Examples include testing the prototype in a test bed aircraft. | Results from testing a prototype system in an operational environment. Who performed the tests? How did the test compare with expectations? What problems, if any, were encountered? What are/were the plans, options, or actions to resolve problems before moving to the next level? |
| 8 | Actual system completed and qualified through test and demonstration. | Technology has been proven to work in its final form and under expected conditions. In almost all cases, this TRL represents the end of true system development. Examples include developmental test and evaluation of the system in its intended weapon system to determine if it meets design specifications. | Results of testing the system in its final configuration under the expected range of environmental conditions in which it will be expected to operate. Assessment of whether it will meet its operational requirements. What problems, if any, were encountered? What are/were the plans, options, or actions to resolve problems before finalizing the design? |
| 9 | Actual system proven through successful mission operations. | Actual application of the technology in its final form and under mission conditions, such as those encountered in operational test and evaluation (OT&E). Examples include using the system under operational mission conditions. | OT&E reports. |

FIG. 1C

View Activities by Category

- ☐ 1. Discovery
- ☐ 2. Formulation
- ☐ 3. Proof of Concept
- ☐ Programmatic
- ☐ Technical
- ☐ Transition Management
  - ☐ Transition
    - Acquisition Program Element (
    - Annual PE funding levels com
    - Current phase of the acquisitio
    - Describe the process for integ
    - Determine current performanc
    - Develop and track definitive, c
    - Document conditions under wh
    - Establish key technical measu
    - Estimate costs for Transition a
    - Estimate of the transition TRL
    - Evolutionary acquisition, block
    - Identify minimum acceptable p
    - Identify personnel responsible
    - Identify the sustainment office
    - Identify the technology needs
    - Include need dates for specific
    - Initiate/Update the TTA
    - Major program objectives

| | |
|---|---|
| Activity | Initiate/update the TTA |
| Status Prompt | Are you planning to produce a TTA commensurate with maturity level? |
| Help Text | a. Initial TDS (TTA v.1) produced at TRL 3 to show interest, b. TDS (TTA v.2) produced at TRL 4 to show Intent, c. Acquisition |
| Is Mandatory | ☐ Push ☒ Pull |
| Role | Technology Manager |
| Exit Criteria | Appropriate version of TTA has been developed |
| Template | |
| Verification Methods | Peer Review |
| Deliverable | |
| Title | Technology Transition Agreement   Section 1.d |
| § Title | Development Strategy |

Export

FIG. 4

RELATIONAL DATABASE METHOD FOR TECHNOLOGY PROGRAM MANAGEMENT

CROSS-REFERENCE TO RELATED APPLICATION(S)

This application is related to and claims the benefit of priority to Provisional Application U.S. Ser. No. 60/974,718, entitled "Relational Database Method for Technology Program Management," by Craver et al., filed Sep. 24, 2007 in the U.S. Patent and Trademark Office, the contents of which are incorporated herein by reference.

STATEMENT OF GOVERNMENT INTEREST

The invention described herein may be manufactured, used, and licensed by or for the U.S. Government for governmental purposes without payment of any royalties thereon.

BACKGROUND

1. Field of the Invention

The present invention relates generally to management of technology development programs and, more particularly, to a method for organizing a relational database used for storing data related to the management of technology development programs.

2. Description of the Related Art

Technology development is often carried out using a stage-gate process with a starting point, defined stages of development bounded by gates, and an ending point. The process requires a logical flow starting at discovery of an idea based upon a need, and ending at successful integration into a product or system that satisfies that need.

During a stage, money is allocated and work is performed. Each stage has specific characteristics against which it is measured to determine whether the stage has been completed. These characteristics include documentation to be delivered (i.e., deliverables), funding allocation, metrics, and goals (i.e., stage exit criteria). Once a stage is completed (deliverables delivered, funding spent, goals met, and metrics satisfied), a decision is made whether to move forward with the program. This is the "gate." Each gate is a decision point for the program to move to the next stage and is typified by a program review.

Every science and technology organization faces the challenges of effectively managing technology development and successfully transitioning technologies to a customer or end user. Often the technology manager does not have clear goals established to know when the technology is finished or when the technology is needed by the acquisition customer, and sometimes the technologist is still refining the technology when the acquisition customer needs it. Transition may be an afterthought rather than being considered as part of technology development, and there may be a lack of customer identification or involvement. In addition, programs that attempt to integrate with immature technologies usually face cost growth and schedule delays, and design stability is not achievable with immature technologies.

Technology development organizations need to be able to assess the readiness of critical technologies for incorporation into a product or system. The Department of Defense (DoD) and many commercial organizations have adopted the use of technology readiness levels (TRLs) for making such an assessment. TRLs are metrics-based indicators of any gaps that exist between the current maturity of a technology and the maturity required to be successfully incorporated in a product or system. If a technology does not meet a pre-defined TRL score, the risks of including the technology in product or system development can be determined and steps can be taken to close the gap.

The TRLs are measured along a scale of 1 to 9, for example, with 1 being the lowest level of technology readiness (such as an initial paper study) and 9 indicating successful use on the intended product or system. The higher the TRL level of key technologies that are included in a product or system, the greater the probability of meeting cost, schedule, and performance requirements. As an example, FIGS. 1A to 1C show the TRLs used by the DoD to assess hardware and the documentation typically created or referenced to support the level assigned to the technology. For a more complete description of TRLs as related to the DoD acquisition process, see United States, Deputy Under Secretary of Defense for Science and Technology, Department of Defense, *Technology Readiness Assessment Deskbook*, May 2005, the contents of which are incorporated herein by reference.

TRL levels are often assigned to particular technologies by forming teams that systematically work through the vague TRL definitions. This can be a very time-consuming and subjective process that can sometimes lead to more questions than answers. Often, consistent guidance on how to assess TRLs does not exist to support these teams. Technology programs that can confidently describe their technical readiness are at much lower risk of failure to successfully transition or meet the needs of their customers/end users.

A tool is needed that aids program managers in the planning, execution, and transition of specific technologies being developed. Such a tool is needed to ensure that the right questions are being asked at the right times during the development of advanced technologies to support successful transition to the customer or end user, and to more efficiently and consistently assess the TRL of a particular technology.

BRIEF SUMMARY OF THE INVENTION

The previously described problems are solved by a Technology Program Management Model (TPMM). The TPMM is a comprehensive technology management model, and as such, contains activities and entry/exit criteria that cover a wide range of management disciplines including Technical, Programmatic, and Transition, which makes it a multi-dimensional tool.

The TPMM is an activities-based model that is subdivided along TRL boundaries into phases of technology development that logically progress from concept to operational capability and readiness for transition to the customer/end user. The TPMM provides a standardized approach to technology development that incorporates systems engineering and programmatic principles and practices with transition management in a stage-gated process for TRL-based maturity assessment. This process enables the technology manager to better demonstrate technology maturity and readiness, facilitating advancement to the next readiness level and development phase.

The TPMM activity model has been implemented in a relational database. The database houses the systems engineering-based activities to be accomplished during each TRL phase of technology development. The relational structure includes multiple tables, which are summarized below.

An Activities table stores information about the activities or tasks to be performed for each TRL.

The activities are grouped into categories and subcategories. A Categories table holds descriptors of the types of category. A SubCategories table holds descriptors of the types of subcategory.

A Roles table is used to describe an organization that is responsible for completion of a selected activity.

A Groups table is used to describe a group within the organization that has responsibility for completing the activity. A GroupMapping table is used to link a group to an activity.

Activities that are logical extensions of one another are virtually connected together to form chains of activities (i.e., threads). An ActivityThreads table describes a unique identifier of a thread that connects activities. A ThreadTypes table stores information for identifying threads and associating an activity with a particular thread group. An ActivityThreadLinks table is used to link an activity to a thread.

External organizations, such as regulatory agencies, may impose external criteria on the management process. An ExtCriteria table provides names and unique identifiers for the external criteria. An ExtCriteriaItems table provides descriptor data to define the external criteria. An ExtMapping table is used to link the external criteria to the Activities table.

The TPMM is subdivided along TRL boundaries into phases of technology development. A Phases table is used to identify the distinct phase in which an activity occurs.

The results of each activity are documented by one or more deliverables (e.g., a report, study, plan strategy, etc.) in any given phase. A Deliverables table stores pointers to the names of the deliverables.

When a selected activity is associated with a deliverable product, a template for that deliverable is provided to the user. A Templates table stores data attribution information for the deliverable templates. An ActivityTemplates table is used to link an activity to a template.

Deliverables may be updated in versions. A Versions table is used to provide a unique identifier for a particular version of a deliverable.

A section represents a distinct block within a deliverable. A Sections table stores information about the sections. A SectionVersions table is used to link sections to specific versions.

A Properties table is used to store information that is used repeatedly, such as the name of a particular technology project.

A Predecessors table is used to populate dependency data between activities during bulk-loading and initialization operations.

A Milestones table is used to provide a way of correlating an activity with a milestone or event during which the deliverable is due to be reviewed or evaluated, and typically represents a gate in a phase at which a particular section in a deliverable document must be completed. A MilestoneTypes table is used to identify a type of milestone at which a particular deliverable or version of a deliverable is to be made available. The milestone type typically represents a set of particular milestones of a similar nature that occur across multiple phases.

A VerMethods table stores information about verification methods that may be used to show that an activity is completed successfully. A Verifications table is used to link a verification method to an activity.

An ExitCriteria table stores information about exit criteria, which are used to determine whether a deliverable in question meets the requirements of the technology phase in which it is executed.

The database construct is used to relate the activities to one another, to required entry and exit criteria necessary to execute each activity, and to the documentation necessary to demonstrate that the activity meets the requirements of each phase. Relationships have been established in the data model that link the performance of activities to key deliverable documentation and force critical (related) activities into consideration. Mechanisms have been designed into the activity model that permit the inclusion of external criteria beyond the standard set for circumstances when such criteria may exist.

According to one aspect of the present invention, a method for creating and organizing a relational database used for storing data associated with the management of a technical development program includes creating an activities repository for storing data associated with activities performed during the development of a technology; dividing the development program into phases and creating a phases table for storing data associated with phases in which the activities occur; and creating a deliverables repository for storing data associated with deliverables generated during the development of a technology.

According to another aspect of the present invention, a computer program product has a computer useable medium with computer program logic stored therein for enabling a computer to store data associated with the management of technical development programs. The computer program logic includes a relational database organization having an activities repository for storing data associated with activities performed during the development of a technology; a phases table for storing data associated with phases of the development program in which the activities occur; and a deliverables repository for storing data associated with deliverables generated during the development of a technology.

According to still another aspect of the present invention, a method for using a relational database for accessing and storing data associated with the management of a technical development program includes constructing the database by creating an activities repository for storing data associated with activities performed during the development of a technology; dividing the development program into phases and creating a phases table for storing data associated with phases in which the activities occur; and creating a deliverables repository for storing data associated with deliverables generated during the development of a technology.

Various aspects and advantages of the invention will become apparent from the following detailed description, taken in conjunction with the accompanying drawings, wherein like numerals refer to like parts throughout.

BRIEF DESCRIPTION OF THE DRAWINGS

FIGS. 1A to 1C illustrate technology readiness levels (TRLs) used to assess the maturity of a technology;

FIG. 4 is a sample screen shot showing activities by category and subcategory according to an embodiment of the present invention.

DETAILED DESCRIPTION OF THE PREFERRED EMBODIMENTS

Figure 2:
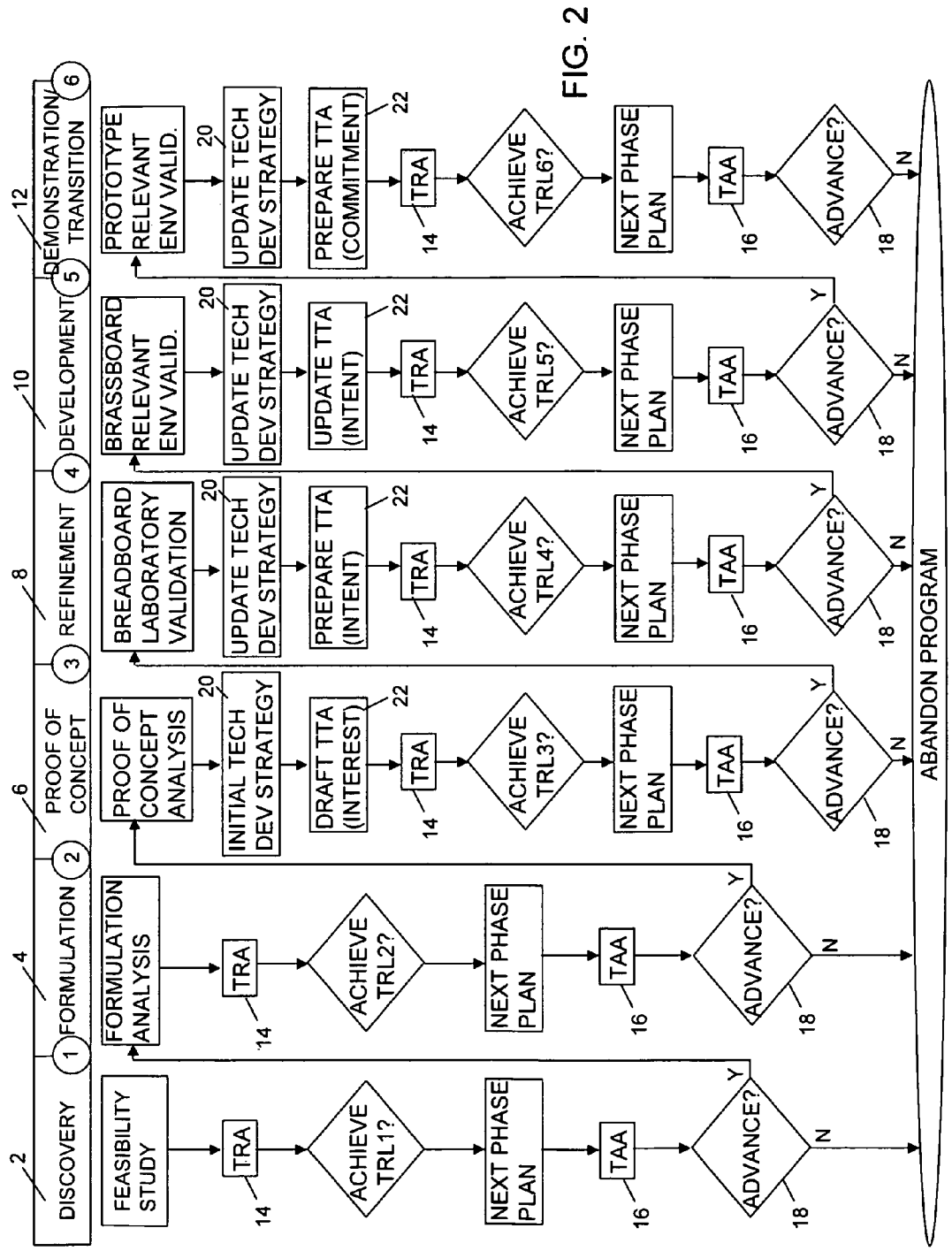
FIG. 2 is a flow diagram of a Technology Program Management Model (TPMM) according to an embodiment of the present invention.

Hereinafter, embodiments of the present invention, with particular application to the Department of Defense (DoD) Government Acquisition process, will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art. For details regarding the DoD acquisition process, see United States, Defense Acquisition Agency, Department of Defense, Defense Acquisition Guidebook, July 2006, the contents of which are incorporated herein by reference.

The Technology Program Management Model (TPMM) is a high-fidelity activity model that provides a flexible management tool to guide technology managers in planning, managing, and assessing their technologies from discovery of an idea through successful transition, culminating at integration with an intended product or system. The TPMM provides a standardized approach to technology development that incorporates systems engineering and programmatic principles and practices with transition management in a stage-gated process for TRL-based maturity assessment. This process enables the technology manager to better demonstrate technology maturity and readiness, facilitating advancement to the next readiness level and development phase.

The TPMM activity model, as shown in the flow diagram of FIG. 2, has been implemented in a relational database, which is described in more detail below. The TPMM is subdivided along TRL boundaries into phases of technology development that logically progress from concept to operational capability and readiness for transition to the customer/end user. The TPMM is therefore broken down into six distinct phases corresponding with the first six TRL levels: Discovery (TRL1) 2, Formulation (TRL2) 4, Proof of Concept (TRL3) 6, Refinement (TRL4) 8, Development (TRL5) 10, and Demonstration/Transition (TRL6) 12.

The TPMM is based upon a stage-gate process. Each gate of the TPMM is a Technology Program Review (TPR), which is conducted at the end of each stage (i.e., phase) to determine whether a program has met the goals of the current TRL and is to advance to the next phase of development. The TPR includes two individual assessments. The first assessment is a Technology Readiness Assessment (TRA) 14, which determines whether the program has achieved a specific readiness level. During the TRA 14, the critical technologies are evaluated against the technical criteria of the TPMM (at the appropriate TRL) for achievement of performance goals. The second assessment is a Technology Advancement Assessment (TAA) 16 for evaluating the planning efforts for the next phase, which considers the programmatic documentation (cost, schedule, funding, and risk) along with an analysis of the transition planning products in making an advancement decision for the technology program. The outcome of the TAA is a decision 18 to either (1) go to the next stage, (2) abandon the program, (3) suspend the program, or (4) recycle the program back into the current stage to satisfy some unsatisfied criteria. Once a decision to go forward to the next stage has been made, funding must be allocated, deliverables defined, and goals and metrics specified for that stage. Then the work for that stage commences. The TPMM uses the TRL gates as the basis for each stage of its stage-gate process.

Rather than considering transition as an afterthought, the TPMM applies an integrated transition management focus throughout the development lifecycle with transition mechanisms that document the development effort and form the basis for transitioning the technology. These mechanisms include the TRA 14, the TAA 16, a Technology Development Strategy (TDS) 20, and a Technology Transition Agreement (TTA) 22. The TDS 20 is a plan for maturing promising key technologies, including prototypes that will be built and tested, performance goals, schedule, funding, specific exit criteria, etc. The TTA 22 is an agreement with the customer/end user and is divided into three versions (INTEREST, INTENT, and COMMITMENT) that document successive levels of commitment between the technology program and the customer/end user.

The TPMM focuses on activities (e.g., programmatics, systems engineering, transition management, risk, and verification tasks) to be performed for each TRL. The activities can be tailored to any given technology development program. The results of each activity are documented by one or more deliverables in any given phase.

The TPMM activity model has been implemented in a relational database. The database houses the systems engineering-based activities for use in each TRL phase of technology development. The database construct is used to relate the activities to one another, to required entry and exit criteria necessary to execute each activity, and to the documentation necessary to demonstrate that the activity meets the requirements of each phase. Relationships have been established in the data model that link the performance of activities to key deliverable documentation and force critical (related) activities into consideration. Mechanisms have been designed into the activity model that permit the inclusion of external criteria beyond the standard set for circumstances when such criteria exist. The TPMM, including a listing of the activities and deliverables associated with each TRL phase, is further described in Craver, Jeffrey T. and Michael S. Ellis, United States Army Space and Missile Defense Command, *Technology Program Management Model Manual*, v.2, 2006, which is incorporated herein by reference.

In addition, the database facilitates effective program management through the creation of project unique instances of tailored activity sets that implicitly describe standard criteria in conjunction with TRLs for performing TRAs 14. The technical manager can plan a technology development program for a specific project by tailoring the core activity set in the database and including only those activities that are deemed necessary to accomplish the stated goals.

Figure 3A:
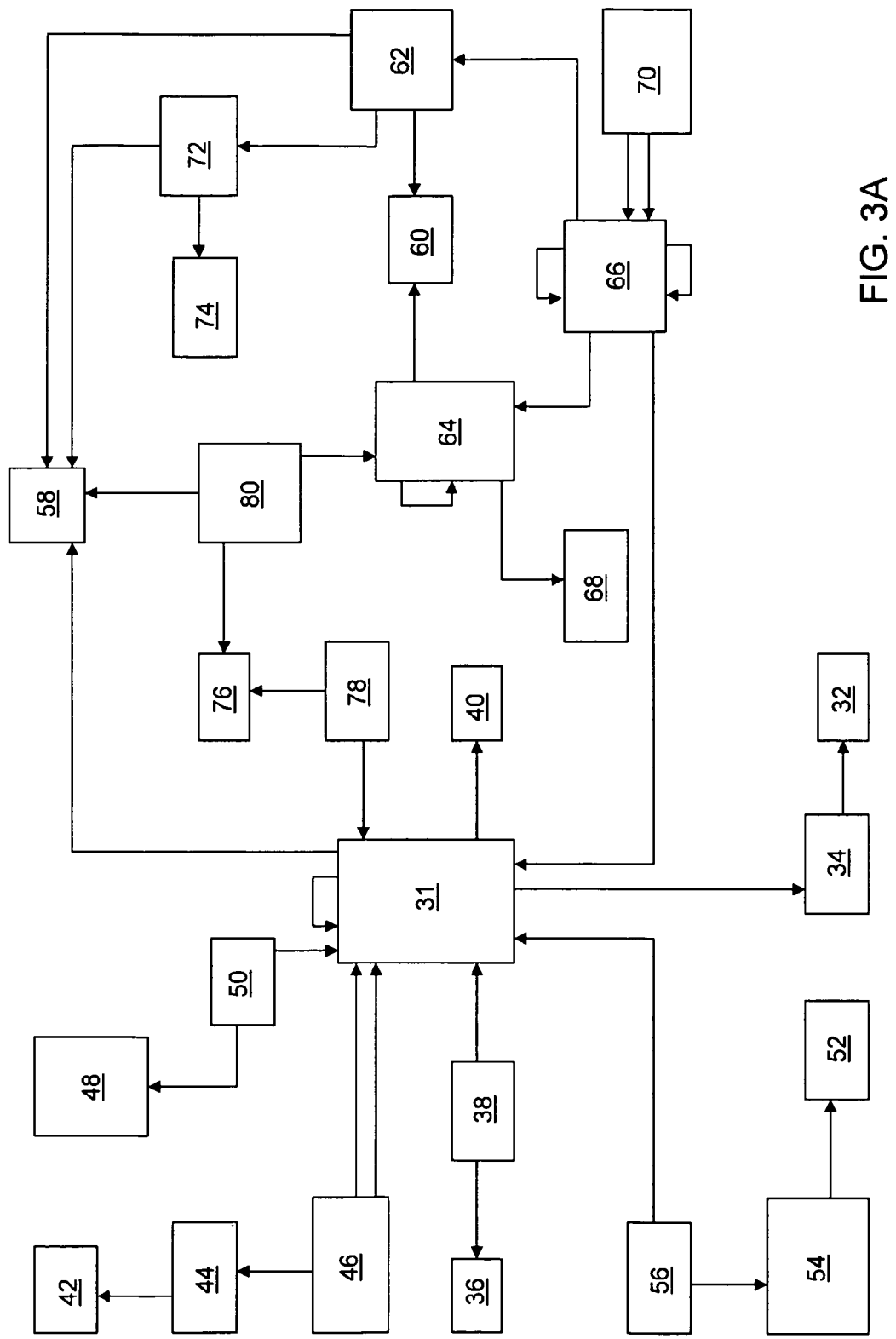
FIG. 3A is a block diagram illustrating tables of a relational database according to an embodiment of the present invention.

FIG. 3A is a block diagram illustrating the tables of the relational database. The TPMM database schema is shown in FIGS. 3B to 3E. The database schema illustrates the relationships between the tables and identifies the attributes of each table that are used as index keys to form the relationships. Each table has a name in the header and a list of fields with associated keys, if any. A description of each table shown in FIGS. 3B to 3E is provided below. In FIGS. 3B to 3E, connectors, such as connector 30 (see FIG. 3B), are added to relationship lines. The connectors join with other connectors having the same letter. The process for operation of a user interface to the database tables will not be described since implementation of such a user interface will be readily apparent to one skilled in the art after reading the description below and examining the drawings.

In the tables, "PK" refers to primary key, "FK" refers to foreign key, "U" refers to unique, and "I" refers to indexed (i.e., an index structure is used to access records). A primary key is a unique identifier of data combinations in a table. A foreign key is a reference to a primary key or another unique key of another table. The tables are linked via various one-to-many relationships. A line drawn between two tables indicates a foreign key relationship. Arrows connect foreign keys to the tables in which the foreign keys are primary keys. An arrow points from a table that contains a foreign key to a table in which the foreign key is a primary key. For example, FK1 in the ActivityThreads table 44 refers to PK in the Thread-Types table 42 (see FIG. 3B). The FK, I, and U symbols also contain a number qualifier, such as "FK1" and "FK2" to distinguish between multiple keys of the same type within the same table. The qualifiers are used to number the instance of each type within a table. Some tables have compound primary keys. For example, the ActivityTemplates table 50 has a compound primary key that includes an ActivityID and a TemplateID.

Figure 3B:
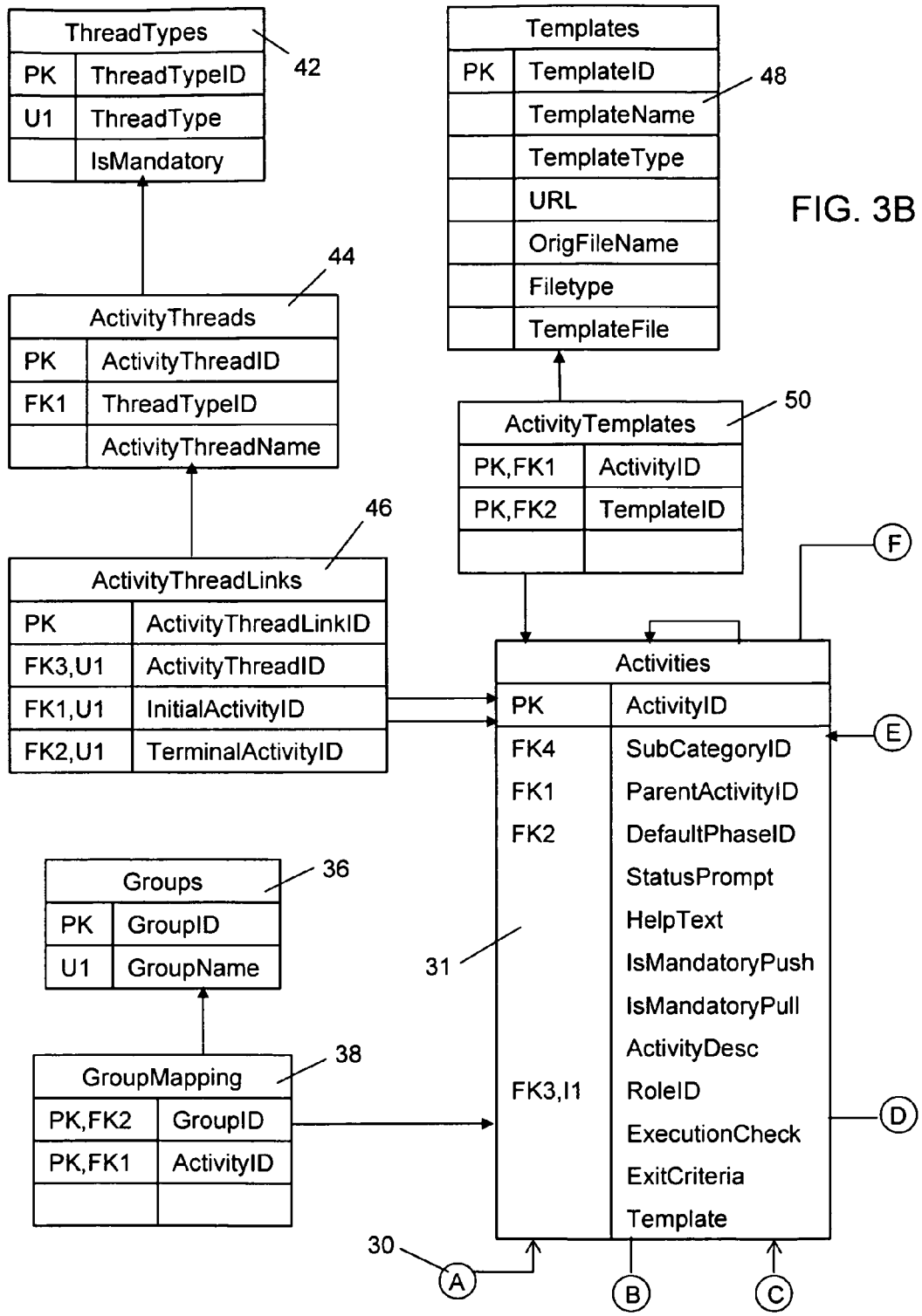
FIGS. 3B to 3E show a relational database schema for the tables shown in FIG. 3A, according to an embodiment of the present invention.
Figure 3C:
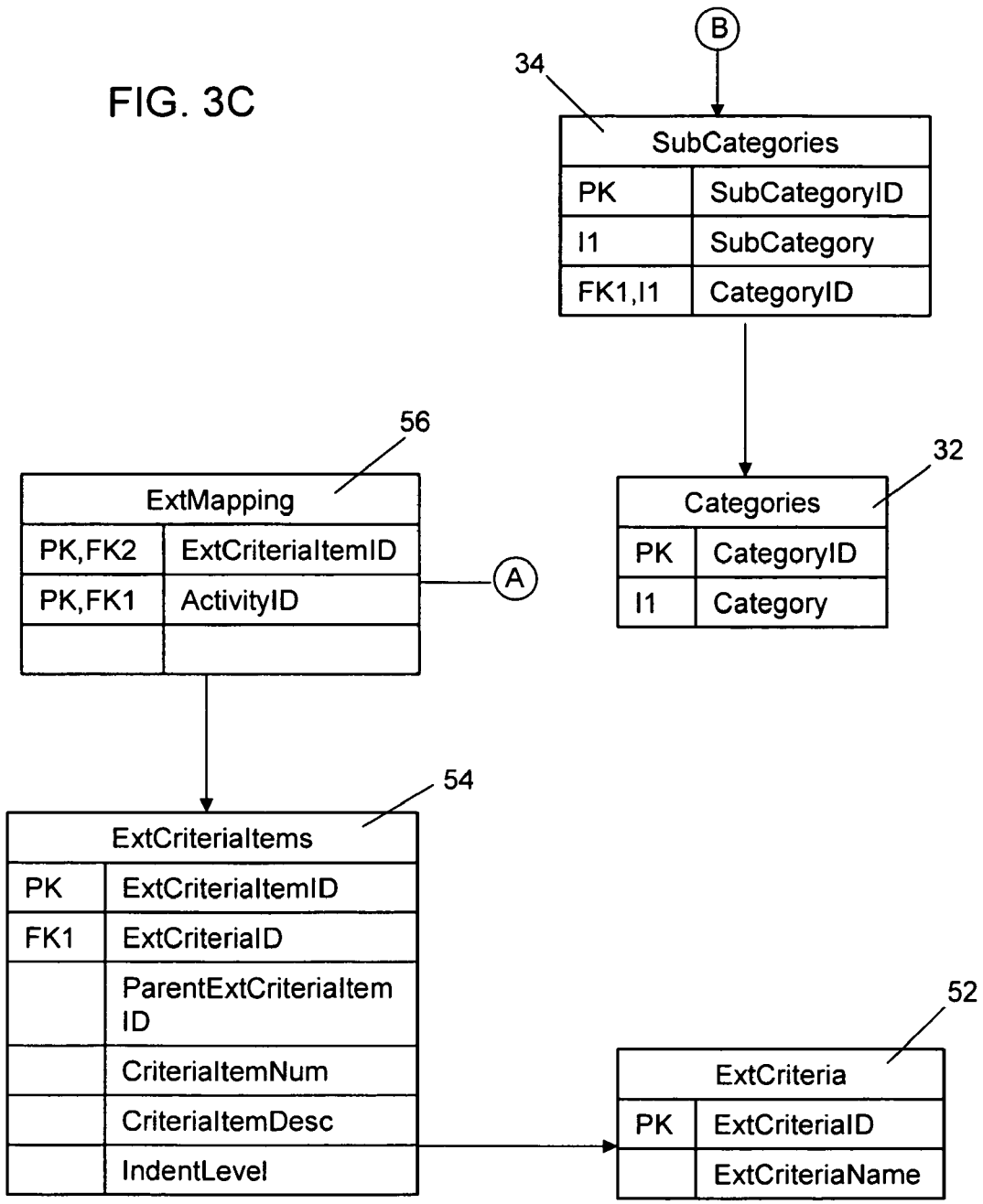
Figure 3D:
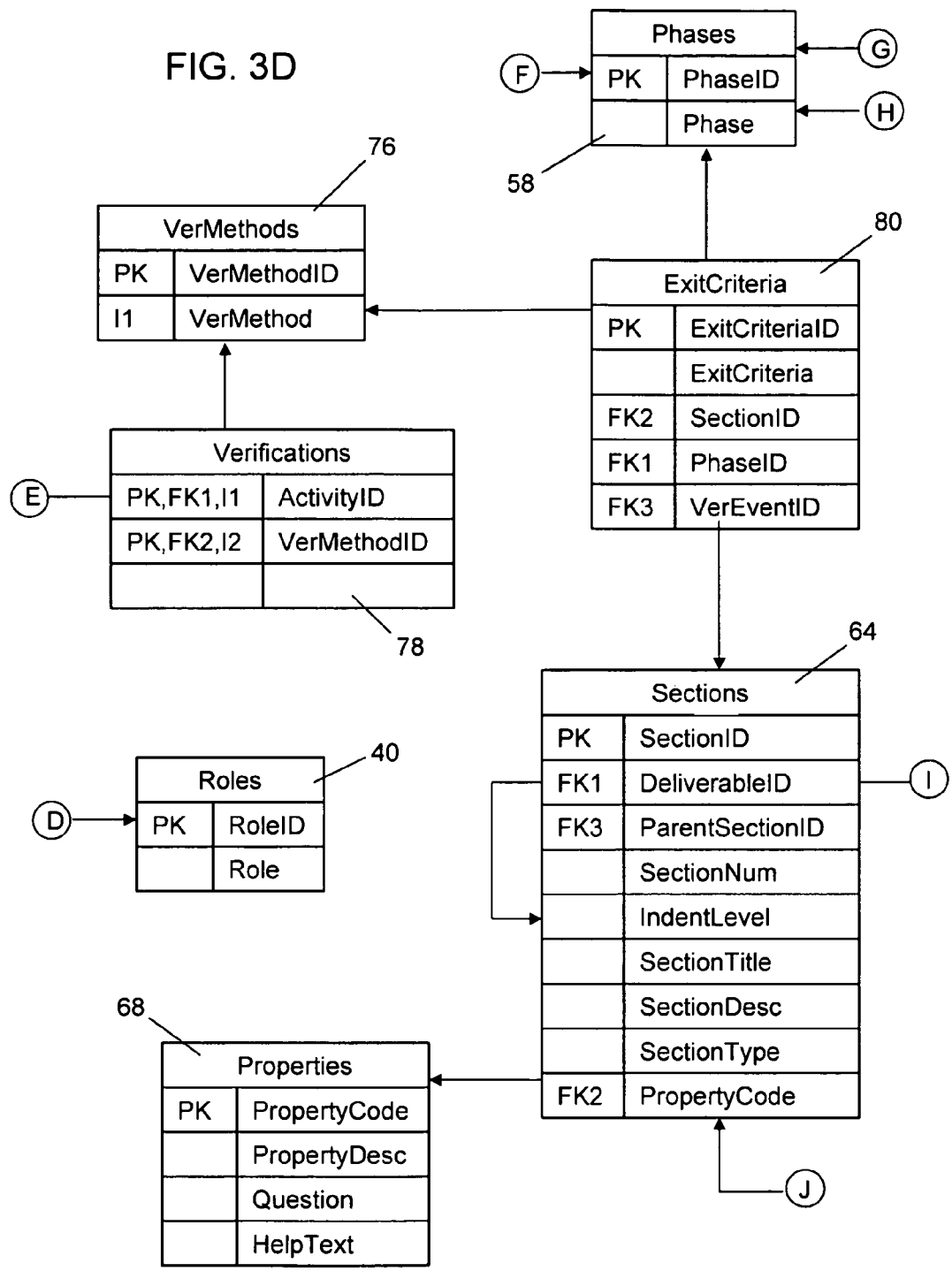
Figure 3E:
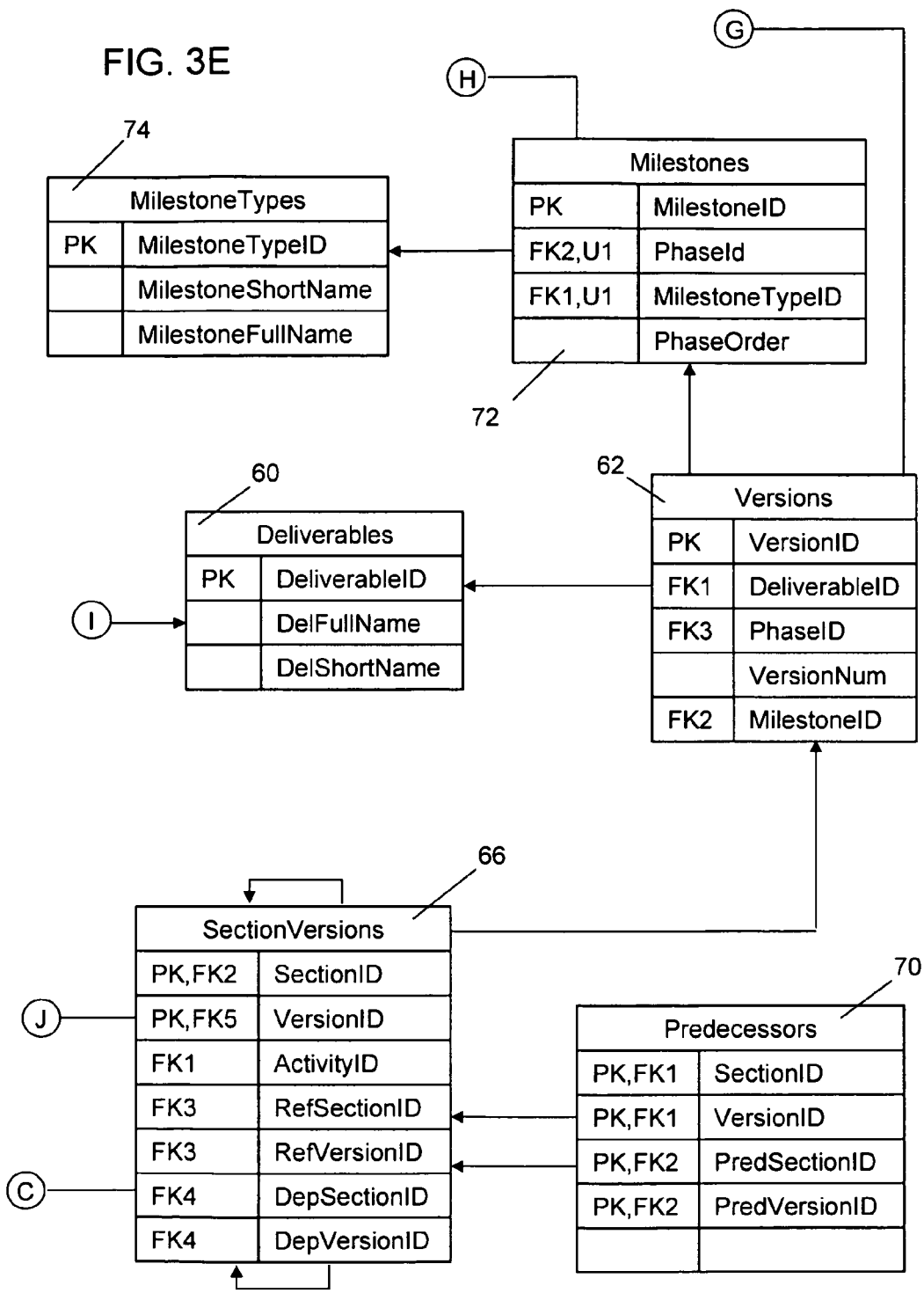

Referring to FIG. 3B, the TPMM is an activity-centric data model and as such, an Activities table 31 is central to the functionality. Activities are at the core of every behavior and are the primary drivers in the development of deliverables. For each technology project instantiated, activities selected from this table form the basis of the work to be performed for that project. The selection of an activity invokes its output (i.e., deliverable). Table I defines the fields of the Activities table 31.

The activities are grouped into categories and subcategories. The categories include, for example, Programmatics, Technical, Transition Management, and Verification. A Categories table 32 (FIG. 3C) holds a descriptor of the category type. Table II defines the fields of the Categories table 32. The Programmatics category is divided into the subcategories of Plans, Cost, Schedule, Risk, Funding, Contracting, and Data Management. The Technical category is divided into the subcategories of Analysis, Systems Engineering, Hardware Development, Software Engineering, and Software Development. The Transition Management category is divided into the subcategories of Insertion and Transition, and the Verification category is divided into the subcategories of Reviews and Testing. A SubCategories table 34 (FIG. 3C) holds a descriptor of the subcategory type. Table III defines the fields of the SubCategories table 34. An example of a display showing activities by category and subcategory is shown in FIG. 4.

TABLE I

Fields of Activities Table 31

| Field Name | Key | Field Type | Field Description |
|---|---|---|---|
| ActivityID | PK | int | The unique identifier for each Activity. |
| SubCategoryID | FK4 | int | The ID of the subcategory to which the activity belongs. (Link to SubCategories table 34.) |
| ParentActivityID | FK1 | int | The ID of the immediate parent activity. This field is used only if the activities are organized in a hierarchy. (Internal link.) |
| DefaultPhaseID | FK2 | int | The default phase in which the activity occurs. (Link to Phases table 58.) |
| StatusPrompt | | varchar (1024) | The prompt displayed to the user when setting the status of the activity within the context of a particular project. (See FIG. 4.) |
| HelpText | | text | The help text describing the activity that is displayed to the user when statusing or browsing activities within the context of a project. (See FIG. 4.) |
| IsMandatoryPush | | bit | True if the activity is mandatory when it is applied to a project that uses the Push model; false, otherwise. (See FIG. 4.) A project that uses the Push model has no customer, just a sponsor who funds the project in anticipation that a customer will emerge when the project's worth has been proven. |
| IsMandatoryPull | | bit | True if the activity is mandatory when it is applied to a project that uses the Pull model; false, otherwise. (See FIG. 4.) A project that uses the Pull model has a customer that funds the project andwants the technology inserted into the customer's program. |
| ActivityDesc | | varchar (1024) | The description of the activity. (See FIG. 4.) |
| RoleID | FK3, I1 | int | The user role to which this activity may be associated. (Link to Roles table 40.) |
| ExecutionCheck | | varchar (1024) | Describes how the user can determine whether the activity has been successfully executed. An execution check is less formal than a verification, and is performed internally as a self-check. |

TABLE II

Fields of Categories Table 32

| Field Name | Key | Field Type | Field Description |
|---|---|---|---|
| CategoryID | PK | int | The unique identifier for the category. |
| Category | I1 | varchar(50) | The unique name of the category. |

TABLE III

Fields of SubCategories Table 34

| Field Name | Key | Field Type | Field Description |
|---|---|---|---|
| SubCategoryID | PK | int | The unique identifier of a subcategory to which one or more activities may belong. |
| SubCategory | I1 | varchar (50) | The descriptive name of the subcategory. This must be unique within a category. |
| CategoryID | FK1, I1 | int | The ID of the category to which this subcategory belongs. (Link to Categories table 32.) |

A Groups table 36 (FIG. 3B) is used in conjunction with a GroupMapping table 38 (FIG. 3B) to correlate an activity with a group in an organization having responsibility for completing the activity. Table IV defines the fields of the Groups table 36. Table V defines the fields of the GroupMapping table 38.

TABLE IV

Fields of Groups Table 36

| Field Name | Key | Field Type | Field Description |
|---|---|---|---|
| GroupID | PK | int | The unique identifier for a group. Groups provide a way to organize activities in a more ad-hoc fashion than categories in that a single activity may belong to more than one group. |
| GroupName | U1 | varchar (50) | The unique name of the group. |

TABLE V

Fields of GroupMapping Table 38

| Field Name | Key | Field Type | Field Description |
|---|---|---|---|
| GroupID | PK, FK2 | int | The ID of the group to which the corresponding activity belongs. (Link to Groups table 36.) |
| ActivityID | PK, FK1 | int | The ID of the activity that belongs to the corresponding group. (Link to Activities table 31.) |

A Roles table 40 (FIG. 3D) is used to describe the organizational role typically responsible for completion of a selected activity. Roles are tailorable, but typically set to common names such as Technology Manager, Systems Engineer, Test and Evaluation, etc. Table VI defines the fields of the Roles table 40.

TABLE VI

Fields of Roles Table 40

| Field Name | Key | Field Type | Field Description |
|---|---|---|---|
| RoleID | PK | int | The unique identifier for a role to which one or more activities may be assigned. A role is typically used to represent which user is responsible for an activity. |
| Role | | varchar (50) | The unique descriptive name of the role. (See FIG. 4.) |

Figure 5:
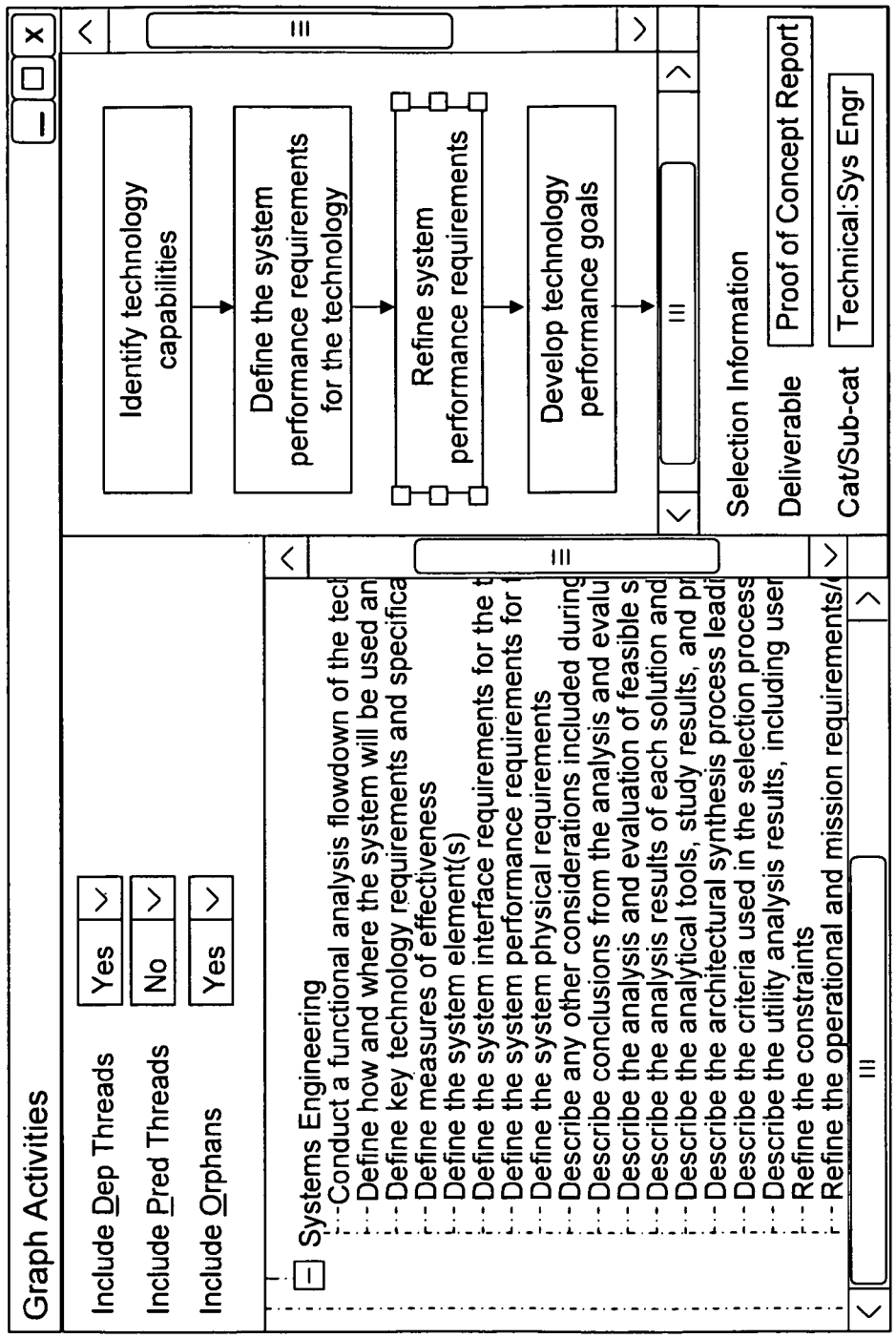
FIG. 5 is a sample screen shot showing a threaded activity according to an embodiment of the present invention.

The TPMM is a threaded model in which activities that are logical extensions of one another are virtually connected together across phase boundaries and within phases to form a chain of activity (i.e., a thread). The threads traverse project stages and form dependencies with predecessor/successor relationships throughout the project lifecycle. In this way, deliverables can migrate throughout the technology development project lifecycle and activities that are critical to the ultimate success of a thread will not be overlooked or will at least be considered. For example, a Program Management Considerations thread includes the activities of (1) perform cost status reporting, (2) perform schedule status reporting, (3) perform risk management, and (4) construct technology funding estimate. An example of a user display showing another thread is illustrated in FIG. 5.

These sets of threaded activities form the basis of the technology development body of knowledge (or knowledge base). Basically, a knowledge base provides a way to reapply known solutions to current problems that can be used by others less experienced in the problem area. As a knowledge-based system, the TPMM provides capabilities for direct knowledge management, establishment of a common language, a mechanism for mentoring new employees, and the seeds of a standard process for technology development and readiness maturity assessment.

A ThreadTypes table 42 (FIG. 3B) is used to house the mechanism for identifying threads and associating an activity with a particular thread group. An ActivityThreads table 44 (FIG. 3B) describes the unique identifier of a thread that connects activities. An ActivityThreadLinks table 46 (FIB. 3B) is used to link an activity to a thread. Table VII defines the fields of the ThreadTypes table 42. Table VIII defines the fields of the ActivityThreads table 44. Table IX defines the fields of the ActivityThreadLinks table 46.

TABLE VII

Fields of ThreadTypes Table 42

| Field Name | Key | Field Type | Field Description |
|---|---|---|---|
| ThreadTypeID | PK | int | The unique identifier of a thread type. The thread type provides a way to group threads that have the same behavior and/or organizational structure. The thread type can be used to apply business logic to threads (e.g., to add a constraint that a thread link may have only one parent thread link). |
| ThreadType | U1 | varchar (50) | A short textual description of the thread type. |
| IsMandatory | | bit | Indicates whether the relationship between initial and terminal items within a link of a thread with this thread type is to be considered semantically mandatory (e.g., the initial activity must be completed in order to complete the terminal activity). |

TABLE VIII

Fields of ActivityThreads Table 44

| Field Name | Key | Field Type | Field Description |
|---|---|---|---|
| ActivityThreadID | PK | int | The unique identifier of a thread that connects activities. |
| ThreadTypeID | FK1 | int | The ID of the type of the thread, where the types are defined in the ThreadTypes table 42. (Link to ThreadTypes table 42.) |
| ActivityThreadName | | varchar (100) | An optional name for the thread that can be used to allow users to more easily identify individual threads. |

TABLE IX

Fields of ActivityThreadLinks Table 46

| Field Name | Key | Field Type | Field Description |
|---|---|---|---|
| ActivityThreadLinkID | PK | int | The unique identifier for a single link of a thread that applies to activities. |
| ActivityThreadID | FK3, U1 | int | The activity thread to which the link belongs. (Link to the ActivityThreads table 44.) |
| InitialActivityID | FK1, U1 | int | The initial activity in the activity thread link. This activity leads to the terminal activity. (Link to Activities table 31.) |
| TerminalActivityID | FK2, U1 | int | The terminal activity in the activity thread link. This activity follows from the initial activity. (Link to Activities table 31.) |

When a selected activity describes the creation of a deliverable (e.g., a report, study, plan strategy, etc.), a template for that deliverable is offered to the user as an example of format and content. A Templates table 48 (FIG. 3B) is used to house data attribution for the deliverable templates. An ActivityTemplates table 50 (FIG. 3B) links activities to deliverable templates. Table X defines the fields of the Templates table 48. Table XI defines the fields of the ActivityTemplates table 50.

TABLE X

Fields of Templates Table 48

| Field Name | Key | Field Type | Field Description |
|---|---|---|---|
| TemplateID | PK | int | The unique identifier for a template. A template provides a document that the user may use when fulfilling the execution requirements for an activity. |
| TemplateName | | varchar (100) | The unique name of the template. |
| TemplateType | | char | A flag indicating what type of document the template represents. "U" indicates the template is a Uniform Resource Locator (URL). "F" indicates the template is an actual file, which may be stored within the database. |
| URL | | varchar (1024) | The URL to which the user can browse to retrieve the template document. If the TemplateType is "U", this field must be set. |
| OrigFileName | | varchar (100) | The original filename of a document file stored within the database if the TemplateType is "F". This is used to re-create the document when extracted from the database. |
| FileType | | varchar (6) | Indicates what type of file is stored within the database if the TemplateType is "F". This is typically the filename extension indicating what type of program is needed to open the template document. |
| TemplateFile | | varbinary | The document file stored as a binary object if the TemplateType is "F". |

TABLE XI

Fields of ActivityTemplates Table 50

| Field Name | Key | Field Type | Field Description |
|---|---|---|---|
| ActivityID | PK, FK1 | int | The ID of the activity to which the corresponding template is associated. (Link to Activities table 31.) |
| TemplateID | PK, FK2 | int | The ID of the template that is associated with the corresponding activity. (Link to the Templates table 48.) |

The TPMM allows for the inclusion of external criteria, which may be imposed by outside agencies, at specified TRL levels (e.g., for domain specific development as in Nuclear Regulatory Commission criteria). An ExtCriteria table 52 (FIG. 3C) provides names and unique identifiers for the external criteria. Table XII defines the fields of the ExtCriteria table 52. An ExtCriteriaItems table 54 (FIG. 3C) provides descriptor data to define the external criteria. Table XIII defines the fields of the ExtCriteriaItems table 54.

TABLE XII

Fields of ExtCriteria Table 52

| Field Name | Key | Field Type | Field Description |
|---|---|---|---|
| ExtCriteriaID | PK | int | The unique identifier of the external criteria set, which represents a set of criteria outside the TPMM that can be mapped to activities within the TPMM. |

TABLE XII-continued

Fields of ExtCriteria Table 52

| Field Name | Key | Field Type | Field Description |
|---|---|---|---|
| ExtCriteriaName | | varchar (50) | A unique name for the external criteria set. |

TABLE XIII

Fields of ExtCriteriaItems Table 54

| Field Name | Key | Field Type | Field Description |
|---|---|---|---|
| ExtCriteriaItemID | PK | int | The unique identifier of an external criteria that can be mapped to one or more activities. |
| ExtCriteriaID | FK1 | int | The ID of the external criteria set to which this external criteria belongs. (Link to ExtCriteria table 52.) |
| ParentExtCriteriaItemID | | int | The ID of the external criteria that is the parent of this external criteria, if any. |
| CriteriaItemNum | | varchar (20) | External criteria are generally identified by a numbering convention established by the source (outside agency) of the external criteria. This field stores the identifier used by the outside agency. |
| CriteriaItemDesc | | varchar (MAX) | The description of the external criteria. This is typically the text of the external criteria within its original domain. |
| IndentLevel | | int | A computed column that indicates what level the external criteria occurs in a set of external criteria that is organized hierarchically. |

An ExtMapping table 56 (FIG. 3C) is used to link the external criteria to the Activities table 31. Table XIV defines the fields of the ExtMapping table 56.

TABLE XIV

Fields of ExtMapping Table 56

| Field Name | Key | Field Type | Field Description |
|---|---|---|---|
| ExtCriteriaItemID | PK, FK2 | int | The ID of the external criteria associated with the corresponding activity. (Link to ExtCriteriaItems table 54.) |
| ActivityID | PK, FK1 | int | The ID of the activity associated with the corresponding external criteria. (Link to Activities table 31.) |

The TPMM is subdivided along TRL boundaries into phases of technology development. A Phases table 58 (FIG. 3D) is used to identify the distinct phase in which an activity occurs. The phases correspond with one of the first six TRL levels: Discovery (TRL1), Formulation (TRL2), Proof of Concept (TRL3), Refinement (TRL4), Development (TRL5), and Demonstration/Transition (TRL6). Table XV defines the fields of the Phases table 58.

TABLE XV

Fields of Phases Table 58

| Field Name | Key | Field Type | Field Description |
|---|---|---|---|
| PhaseID | PK | int | The unique identifier for a phase. |
| Phase | | varchar(50) | The unique name of the phase. |

When a selected activity describes the creation of a deliverable, which is generated on an output device such as a computer display or a printer, a Deliverables table 60 (FIG. 3E) houses pointers to the deliverable names. An example of a deliverable is a Feasibility Study produced during the Discovery Phase to document the results of a literature search that is performed to determine whether the technology has already been developed. Table XVI defines the fields of the Deliverables table 60.

TABLE XVI

Fields of Deliverables Table 60

| Field Name | Key | Field Type | Field Description |
|---|---|---|---|
| DeliverableID | PK | int | The unique identifier for the deliverable. |
| DelFullName | | varchar (100) | The full name of the deliverable. (See FIG. 4.) |
| DelShortName | | varchar (10) | A short name of the deliverable. Used when displaying the full name would be unwieldy or awkward. |

Several deliverables called out in the TPMM are produced in one phase and updated in subsequent phases (e.g., the Technology Development Strategy (TDS) 20 and the Technology Transition Agreement (TTA) 22, as shown in FIG. 2). The updated deliverables are referred to as "versions." A Versions table 62 (FIG. 3E) is used to provide a unique identifier for a version of a deliverable. The version provides a mechanism for working with deliverables that have a lifecycle that spans multiple phases. Table XVII defines the fields of the Versions table 62.

TABLE XVII

Fields of Versions Table 62

| Field Name | Key | Field Type | Field Description |
|---|---|---|---|
| VersionID | PK | int | The unique identifier for a version of a deliverable. |
| DeliverableID | FK1 | int | The ID of the deliverable to which this version applies. (Link to Deliverables table 60.) |
| PhaseID | FK3 | int | The phase to which this version applies. (Link to Phases table 58.) |
| VersionNum | | int | The number to be displayed when referring to this particular version of a deliverable. |
| MilestoneID | FK2 | int | A milestone that may be associated with this particular version of a deliverable. (Link to Milestones table 72.) |

A section represents a distinct block within a deliverable. A Sections table 64 (FIG. 3D) is used to house the section number identifier, referenced by the selected activity, of the section within the deliverable, which must be unique within a deliverable. This number is provided as part of the header for the section when a deliverable is generated. For example, considering the Feasibility Study paper that is produced during the Discovery Phase to document the results of the literature search, Section 5 of the paper has the section title "Literature Search," the Activity to be performed is "Perform Literature Search," and the section description is "A literature search is conducted to ensure the technology doesn't already exist or isn't being developed, to determine alternatives, to gather supporting data, etc." Table XVIII defines the fields of the Sections table 64.

TABLE XVIII

Fields of Sections Table 64

| Field Name | Key | Field Type | Field Description |
|---|---|---|---|
| SectionID | PK | int | The unique identifier of a section, which represents a distinct block within a deliverable. |
| DeliverableID | FK1 | int | The ID of the deliverable to which the section belongs. (Link to Deliverables table 60.) |
| ParentSectionID | FK3 | int | The ID of the parent section of this section if any. This provides a way to organize sections hierarchically within a deliverable. |
| SectionNum | | varchar (10) | The section number of the section within the deliverable, which must be unique within a deliverable. This number is provided as part of the header for the section when a deliverable is generated. (See FIG. 4.) |
| IndentLevel | | int | A computed column that indicates at which indentation level the section occurs within a deliverable whose sections are organized hierarchically. |
| SectionTitle | | varchar (100) | The title of the section. This text is included as part of the header for the section when a deliverable is generated. (See FIG. 4.) |
| SectionDesc | | varchar (MAX) | A text description of the section that is provided as the body of the section when a deliverable is generated. |
| SectionType | | char | A flag that indicates whether the section represents a distinct block within a deliverable that may be associated with an activity or if it represents a title only (which can be thought of as a rollup of the sections below it). For instance, section 4.0 has subsections 4.1, 4.2, etc. Section 4.0 would be set to indicate a header that is a rollup of the subsections below, while section 4.2 in this example would be a section that is directly related to an activity. |
| PropertyCode | FK2 | varchar (30) | A code for a property associated with the section. (Link to Properties table 68.) |

A SectionVersions table 66 (FIG. 3E) is used to provide a linkage to track a deliverable for an activity to specific document versions. Table XIX defines the fields of the SectionVersions table 66.

TABLE XIX

Fields of SectionVersions Table 66

| Field Name | Key | Field Type | Field Description |
|---|---|---|---|
| SectionID | PK, FK2 | int | The ID of the section portion of the unique combination of a section and a particular version of a deliverable. (Link to Sections table 64.) |

TABLE XIX-continued

Fields of SectionVersions Table 66

| Field Name | Key | Field Type | Field Description |
|---|---|---|---|
| VersionID | PK, FK5 | int | The ID of the version portion of the unique combination of a section and a particular version of a deliverable. (Link to Versions table 62.) |
| ActivityID | FK1 | int | The ID of the activity associated with this section version, if any. (Link to Activities table 31.) |
| RefSectionID | FK3 | int | The ID of the section portion of a section version to which this section version refers. If set, RefVersionID must be set also. This indicates that the content of the section version will refer the reader to the reference section version when a deliverable is generated. (Internal link.) |
| RefVersionID | FK3 | int | The ID of the version portion of a section version to which this section version refers. If set, RefSectionID must be set also. (Internal link.) |
| DepSectionID | FK4 | int | The ID of the activity associated with this Dependent section of a Deliverable, if any. (Internal link.) |
| DepVersionID | FK4 | int | The ID of the activity associated with this Dependent version of a Deliverable, if any. (Internal link.) |

A Properties table 68 (FIG. 3D) is used to house information concerning property to which one or more sections may be associated. In other words, the Properties table 68 stores information that is repeated, such as "Project Name," in multiple sections throughout the documentation of a technology project. Properties are recurrent data items that the user is required to enter once and that are automatically supplied wherever the data are referenced. Table XX defines the fields of the Properties table 68.

TABLE XX

Fields of Properties Table 68

| Field Name | Key | Field Type | Field Description |
|---|---|---|---|
| PropertyCode | PK | varchar(30) | The unique code for a property. |
| PropertyDesc | | varchar(50) | The short description of the property. |
| Question | | varchar(1024) | A question provided to the user when prompting for the content of a property. |
| HelpText | | varchar(MAX) | A more lengthy text that provides additional help to the user about the property. |

A Predecessors table 70 (FIG. 3E) is used to populate dependency data between activities during bulk-loading and initialization operations. Table XXI defines the fields of the Predecessors table 70.

TABLE XXI

Fields of Predecessors Table 70

| Field Name | Key | Field Type | Field Description |
|---|---|---|---|
| SectionID | PK, FK1 | int | The ID of the section portion of a deliverable. (Link to SectionVersions table 66.) |
| VersionID | PK, FK1 | int | The ID of the version portion of a deliverable. (Link to SectionVersions table 66.) |

TABLE XXI-continued

Fields of Predecessors Table 70

| Field Name | Key | Field Type | Field Description |
|---|---|---|---|
| PredSectionID | PK, FK2 | int | The ID of the activity associated with this Predessor section of a Deliverable, if any. (Link to SectionVersions table 66.) |
| PredVersionID | PK, FK2 | int | The ID of the activity associated with this Predecessor version of a Deliverable, if any. (Link to SectionVersions table 66.) |

A Milestones table 72 (FIG. 3E) is used to provide a way to correlate an activity with the milestone or event during which the deliverable is due to be reviewed or evaluated. A milestone typically represents the particular stage gate in a phase at which a particular section in a deliverable document must be completed. Table XXII defines the fields of the Milestones table 72.

TABLE XXII

Fields of Milestones Table 72

| Field Name | Key | Field Type | Field Description |
|---|---|---|---|
| MilestoneID | PK | int | The unique identifier for a milestone. |
| PhaseID | FK2, U1 | int | The ID of the phase in which this milestone occurs. (Link to Phases table 58.) |
| MilestoneTypeID | FK1, U1 | int | The ID of the type of milestone. (Link to MilestoneTypes table 74.) |
| PhaseOrder | | smallint | The order within a phase in which this milestone occurs with respect to other milestones. |

A MilestoneTypes table 74 (FIG. 3E) is used to identify a milestone type at which a particular Deliverable or version of a deliverable will be required to be made available. The milestone type typically represents a set of particular milestones of a similar nature that occur across multiple phases. Examples include System Design Review, Test Readiness Review (TRR), Technology Readiness Assessment (TRA), etc. Table XXIII defines the fields of the MilestoneTypes table 74.

TABLE XXIII

Fields of MilestoneTypes Table 74

| Field Name | Key | Field Type | Field Description |
|---|---|---|---|
| MilestoneTypeID | PK | int | The unique identifier for the type of milestone. |
| MilestoneShortName | | varchar(10) | The unique short name of the milestone type. The short name is used when using the full name would be unwieldy or awkward. |
| MilestoneFullName | | varchar(50) | The unique full name of the milestone type. |

A VerMethods table 76 (FIG. 3D) is used to house a unique identifier of a verification method. One or more verification methods may be used to show that an activity is completed successfully. Table XXIV defines the fields of the VerMethods table 76.

TABLE XXIV

Fields of VerMethods Table 76

| Field Name | Key | Field Type | Field Description |
|---|---|---|---|
| VerMethodID | PK | int | The unique identifier of a verification method. |
| VerMethod | I1 | varchar (100) | A textual description of the verification method. (See FIG. 4.) |

A Verifications table 78 (FIG. 3D) is used to link a verification method to an activity. Table XXV defines the fields of the Verifications table 78.

TABLE XXV

Fields of Verifications Table 78

| Field Name | Key | Field Type | Field Description |
|---|---|---|---|
| ActivityID | PK, FK1,I1 | int | The ID of the activity that uses the corresponding verification method. (Link to Activities table 31.) |
| VerMethodID | PK, FK2,I2 | int | The ID of the verification method used by the corresponding activity. (Link to VerMethods table 76.) |

The model provides exit criteria as a mechanism to evaluate whether the deliverable of the activity in question meets the requirements of the technology phase in which it is planned to be executed. The exit criteria are assessed during the Technology Readiness Assessment (TRA) 14 (see FIG. 2). An example of the exit criteria for Section 5 of the Feasibility Study that is produced during the Discovery Phase to document the results of the literature search is "literature search relevant to the identified need demonstrates that this concept has potential and is not a duplication of other efforts." An ExitCriteria table 80 (FIG. 3D) provides a pointer and descriptor data to define the exit criteria. Table XXVI defines the fields of the ExitCriteria table 80.

TABLE XXVI

Fields of ExitCriteria Table 80

| Field Name | Key | Field Type | Field Description |
|---|---|---|---|
| ExitCriteriaID | PK | int | The unique identifier of the exit criteria. |
| ExitCriteria | | varchar (MAX) | The description of the exit criteria which represents the stage gate for the associated phase and section of a deliverable. (See FIG. 4.) |
| SectionID | FK2 | int | The ID of the section of a deliverable with which the exit criteria is associated. (Link to Sections table 64.) |
| PhaseID | FK1 | int | The ID of the phase in which the exit criteria exists. (Link to Phases table 58.) |
| VerEventID | FK3 | int | The verification method used to complete the exit criteria. (Link to VerMethods table 76.) |

A summary of table relationships follows.

The ActivityID field is included in the Activities table 31, the GroupMapping table 38, the ActivityTemplates table 50, the ExtMapping table 56, the SectionVersions table 66, and the Verifications table 78. The ActivityID field is a unique identifier for each activity.

The CategoryID field is included in the Categories table 32 and the SubCategories table 34. The CategoryID field is a unique identifier for the category to which an activity belongs.

The SubCategoryID field is included in the SubCategories table 34 and the Activities table 31. The SubCategoryID field is the ID of the subcategory to which an activity belongs.

The GroupID field is included in the Groups table 36 and the GroupMapping table 38. The GroupID field is the ID of the group to which a corresponding activity belongs.

The RoleID field is included in the Roles table 40 and the Activities table 31. The RoleID field is the unique identifier for a role to which one or more activities may be assigned.

The ActivityThreadID field is included in the ActivityThreads table 44 and the ActivityThreadLinks table 46. The ActivityThreadID field is the unique identifier of a thread that connects activities.

The ThreadTypeID field is included in the ThreadTypes table 42 and the ActivityThreads table 44. The ThreadTypeID field is the unique identifier of a thread type.

The TemplateID field is included in the Templates table 48 and the ActivityTemplates table 50. The TemplateID field is the ID of the template that is associated with a corresponding activity.

The ExtCriteriaID field is included in the ExtCriteria table 52 and the ExtCriteriaItems table 54. The ExtCriteriaID field is the unique identifier of an external criteria set.

The ExtCriteriaItemID field is included in the ExtCriteriaItems table 54 and the ExtMapping table 56. The ExtCriteriaItemID field is the unique identifier of an external criterion that can be mapped to one or more activities.

The PhaseID field is included in the Phases table 58, the Versions table 62, the Milestones table 72, and the ExitCriteria table 80. The PhaseID field is the unique identifier for a phase.

The DeliverableID field is included in the Deliverables table 60, the Versions table 62, and the Sections table 64. The DeliverableID field is the unique identifier for a deliverable.

The VersionID field is included in the Versions table 62, the SectionVersions table 66, and the Predecessors table 70. The VersionID field is the unique identifier for a version of a deliverable.

The SectionID field is included in the Sections table 64, the SectionVersions table 66, the Predecessors table 70, and the ExitCriteria table 80. The SectionID field is the unique identifier of a section, which represents a distinct block within a deliverable.

The MilestoneID field is included in the Milestones table 72 and the Versions table 62. The MilestoneID field is the unique identifier for a milestone.

The MilestoneTypeID field is included in the MilestoneTypes table 74 and the Milestones table 72. The MilestoneTypeID field is the unique identifier for the type of milestone.

The VerMethodID field is included in the VerMethods table 76 and the Verifications table 78. The VerMethodID field is the unique identifier of a verification method.

The PropertyCode field is included in the Properties table 68 and the Sections table 64. The PropertyCode field is the unique code for a property.

Also, the Activities table 31 is related to the Phases table 58 through the DefaultPhaseID field (FK2) in the Activities table 31 and the PhaseID field (PK) in the Phases table 58.

The Activities table 31 and the ActivityThreadLinks table 46 are related through the InitialActivityID field (FK1) and the TerminalActivityID field (FK2) in the ActivityThreadLinks table 46 and the ActivityID field (PK) in the Activities table 31.

The ExitCriteria table 80 and the VerMethods table 76 are related through the VerEventID field (FK3) in the ExitCriteria table 80 and the VerMethodID field (PK) in the VerMethods table 76.

The SectionVersions table 66 and the Predecessors table 70 are related through the SectionID field (FK1) and the PredSectionID field (FK2) in the Predecessors table 70 and the SectionID field (PK) in the SectionVersions table 66, and through the VersionID field (FK1) and the PredVersionId field (FK2) in the Predecessors table 70 and the VersionID field (PK) in the SectionVersions table 66.

In addition, the Activities table 31 has internal linkage between the ParentActivityID (FK1) and the ActivityID (PK), which allows for hierarchy.

The SectionVersions table 66 has two internal linkages. The first is between the compound foreign key RefSectionId (FK3) and RefVersionID (FK3) to the compound primary key SectionID (PK) and VersionID (PK). The second internal linkage is between the compound foreign key DepSectionID (FK4) and DepVersionID (FK4) to the compound primary key SectionID (PK) and VersionID (PK).

Those of ordinary skill in the art should recognize that methods involved in managing technology program development using a relational database may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

The TPMM database is preferably implemented using Microsoft SQL Server™. In addition, in a preferred embodiment, the application environment is Microsoft Windows® Desktop, the code base is Microsoft®.NET Framework, and the development environment is Microsoft Visual® Studio 2005.

The TPMM provides an objective systems engineering approach to assessing, maturing, managing, and transitioning technologies that is reliable and repeatable. The basic structure of the TPMM allows it to be adapted as a tool in any stage-gate process used to develop a product or system. Within the science and technology community, the TPMM provides several benefits, such as (1) defining phases of technology development in terms of TRLs, (2) establishing consistent exit criteria and deliverable documents for each phase, (3) applying system engineering principles and practices, (4) focusing on successful technology transition activities, and (5) providing the criteria supporting early and ongoing Technology Transition Agreements, which includes all stakeholders early in the development process. In addition, the TPMM provides a common language set for TRL interpretation and management decision metrics and confidence in the estimation of the maturity (through Technology Readiness Assessment (TRA) results).

The TPMM, with its activity-centric architecture, provides a TRL-based, threaded activity tool set for planning, assessing, and quantifying technology readiness levels in an understanding of technology development maturity and system readiness. With the inclusion of the multi-dimensional features of Systems Engineering, Programmatics, and Transition Management, the TPMM insures that technologies meet the needs of acquisition programs and transition for insertion on time.

The present invention has been described with respect to the DoD acquisition process. However, the invention can be applied to any product/system development process, particularly to those technology development efforts occurring in stages/phases (e.g., automobiles, aircraft, computers, etc.), by tailoring the core activity set in the database and including only those activities that are deemed necessary to accomplish the stated goals (e.g., if the program has no software, the software-specific tasks would be eliminated from the criteria set), and by populating the ExitCriteria table 80 and the Deliverables table 60.

Thus, it will be appreciated by those skilled in the art that modifications and variations of the present invention are possible without departing from the principles and spirit of the invention, the scope of which is defined in the appended claims and their equivalents.

What is claimed is:

1. A technology development program manager for inputting, managing, and outputting programmatics, technical, transition management, and verification data, and having a relational database comprising:

an Activities table for storing data associated with activities performed during development of a technology;

a Categories table for storing data associated with categories into which the activities are grouped;

a SubCategories table for storing data associated with subcategories into which the activities are grouped;

a Roles table for storing data associated with an organization responsible for completion of a selected activity;

a Groups table for storing data related to a group in the organization responsible for completing the selected activity;

a GroupMapping table for storing data associated with linking activities to groups;

a ThreadTypes table for storing data associated with identifying threads and associating activities with particular thread groups;

an ActivityThreads table for storing data associated with identifying threads that connect activities;

an ActivityThreadLinks table for storing data associated with linking activities to threads;

an ExtCriteriaSet table for storing data associated with naming external criteria;

an ExtMapping table for storing data associated with linking activities to the external criteria;

an ExtCriteriaItems table for storing data associated with pointers and descriptor data for defining the external criteria;

a Phases table for storing data associated with phases of the technology development program in which the activities occur;

a Deliverables table for storing data associated with deliverables used to document results of each activity;

a Templates table for storing data associated with templates of the deliverables;

an ActivityTemplates table for storing pointers to the deliverable templates;

a Versions table for storing data associated with versions of each deliverable;

a Sections table for storing data associated with sections of each deliverable;

a SectionVersions table for storing data associated with linking sections to specific versions;

a Properties table for storing data associated with sections of properties;

a MilestoneTypes table for storing data associated with milestone events during which a particular deliverable is due;

a Milestones table for storing data associated with phases in which milestones occur;

a Verifications table for storing data associated with verification methods used to show successful completion of the activities;

a VerMethods table for storing data associated with linking verification methods with activities; and an ExitCriteria table for storing data associated with exit criteria used to determine whether a deliverable in question meets the requirements of a particular phase in which the deliverable in question is executed.

2. The technical development program manager of claim 1, further comprising:

an ActivityID field linking records of the Activities table, the GroupMapping table, the ActivityTemplates table, the ExtMapping table, the Section Versions table, and the Verifications table, the ActivityID field being a unique identifier for each activity;

a CategoryID field linking records of the Categories table and the SubCategories table, the CategoryID field being a unique identifier for each category to which the selected activity belongs;

a SubCategoryID field linking records of the SubCategories table and the Activities table, the SubCategoryID field being a unique identifier for each subcategory to which the activity belongs;

a GroupID field linking records of the Groups table and the GroupMapping table, the GroupID field being a unique identifier for each group to which the selected activity belongs;

a RoleID field linking records of the Roles table and the Activities table, the RoleID field being a unique identifier for a role to which the selected activity is assigned;

an ActivityThreadID field linking records of the ActivityThreads table and the ActivityThreadLinks table, the ActivityThreadID field being unique identifier of each thread that connects certain ones of the activities;

a ThreadTypeID field linking records of the ThreadTypes table and the ActivityThreads table, the ThreadTypeID field being a unique identifier of a thread type;

a TemplateID field linking records of the Templates table and the ActivityTemplates table, the TemplateID field being a unique identifier of each template that is associated with the selected activity;

an ExtCriteriaItemID field linking records of the ExtCriteriaItems table and the ExtMapping table, the ExtCriteriaItemID field being a unique identifier of each external criteria associated with one or more of the activities;

a PhaseID field linking records of the Phases table, the Versions table, the Milestones table, and the ExtCriteria table, the PhaseID field being a unique identifier for each phase;

a DeliverableID field linking records of the Deliverables table, the Versions table, and the Sections table, the DeliverableID field being a unique identifier for each deliverable;

a VersionID field linking records of the Versions table, the SectionVersions table, and the Predecessors table, the VersionID field being a unique identifier for each version of a selected deliverable;

a SectionID field linking records of the Sections table, the SectionVersions table, the Predecessors table, and the ExitCriteria table, the SectionID field being a unique identifier of each section within the selected deliverable;

a MilestoneID field linking records of the Milestones table and the Versions table, the MilestoneID field being a unique identifier for each milestone;

a MilestoneTypeID field linking records of the MilestoneTypes table and the Milestones table, the MilestoneTypeID field being a unique identifier for each type of milestone;

a VerMethodID field linking records of the VerMethods table and the Verifications table, the VerMethodID field being a unique identifier of each verification method; and a PropertyCode field linking records of the Properties table and the Sections table, the Property Code field being a unique code for each property.

\* \* \* \* \*